United States Patent [19]

Cecchin et al.

[11] 3,878,325

[45] Apr. 15, 1975

[54] NOISE PROCESSING CIRCUIT FOR A TELEVISION RECEIVER

[75] Inventors: Gildo Cecchin, Niles; Francis H. Hilbert, Addison, both of Ill.

[73] Assignee: Motorola, Inc., Franklin Park, Ill.

[22] Filed: Feb. 5, 1973

[21] Appl. No.: 329,924

[52] U.S. Cl. .................... 178/7.3 DC; 178/DIG. 12

[51] Int. Cl. ............................................ H04n 5/48

[58] Field of Search ........ 178/7.3 S, 7.5 S, DIG. 12, 178/7.5 DC, 7.5 R, 7.3 D, 7.5 D, 7.3 DC

[56] References Cited

UNITED STATES PATENTS 2,710,347 6/1955 Brady.......................... 178/DIG. 12

*Primary Examiner*—Richard Murray
*Assistant Examiner*—R. John Godfrey
*Attorney, Agent, or Firm*—Mueller, Aichele & Ptak

[57] ABSTRACT

Unwanted noise components in a derived composite video signal are processed in a novel noise processing circuit to effectively minimize the otherwise deleterious effects on the operation of associated electronic apparatus, such as a television receiver or the like. The circuit arrangement is such that a control signal of a selectably fixed amplitude is developed in response to each such unwanted noise component above a set, predetermined amplitude. The derived control signals are then substituted in place of such undesired noise components, on a one for one basis. A feature of the invention is that the derived control signals replacing the noise components are effected at an intermediate, or gray level, with respect to the video information being displayed and thereby minimizes the overall visual impact that would otherwise be evident.

6 Claims, 3 Drawing Figures

NOISE PROCESSING CIRCUIT FOR A TELEVISION RECEIVER

BACKGROUND OF THE INVENTION

The present invention relates in general to noise processing circuits and, more particularly, to such an arrangement for a television receiver to eliminate or otherwise minimize the deleterious effects of unwanted noise components in a derived composite video signal.

Noise processing or protection circuits for suppressing or otherwise compensating for extraneous, and of course undesired, noise components in a derived composite video signal as processed in a television receiver are known in the art. Many of the prior art systems are designed to simply suppress the unwanted noise components as much as possible before the sync components are separated from the composite signal. Other protection schemes are intended to produce gating pulses to disable or lock off portions of the receiver, such as the sync separator and the automatic gain control (AGC) section. Still others simply clip the peaks of the noise components at some convenient reference level above sync tips.

While many of the prior noise protection arrangements are successful to varying degrees in their intended purpose, i.e., suppressing or otherwise immunizing receiver operation of the destructive effects of noise, there are certain drawbacks that are nevertheless quite apparent. An operational deficiency common to all such prior systems is that the effects of such noise processing are readily discernable to the eye of the viewer. If the noise peaks are merely clipped off at some reference level, the remaining noise component portions are necessarily at a signal amplitude greater than sync tip level and thus appear in the reproduced video information as black level information. Indeed, they are actually blacker than black. On the other hand, where the noise components are completely excised from the composite video signal information, such as described for the system as disclosed in U.S. Pat. No. 3,624,288, issuing Nov. 30, 1971 to Judson A Hofman, the signal level at that point is effectively reduced to white level. In either case, the result is readily discerned in the reproduced image because the resultant levels are at either of the two extremes, full black or full white. The effect is even more visually disturbing if the predominant background of the reproduced image is opposite to that as produced by the noise processing circuit. That is, where black level is injected into a scene with predominantly white background or alternatively, white level for predominantly dark scenes.

SUMMARY OF THE INVENTION

Accordingly, an object of the present invention is to provide an improved noise processing circuit arrangement for a television receiver which overcomes the above-described operational deficiencies.

A more particular object of the present invention is to provide an improved noise processing circuit for modifying or otherwise processing undesired noise components in a composite video signal in a manner to effectively minimize the undesired visual effects thereof in the reproduced image on the television receiver screen.

Another object of the present invention is to provide an improved noise processing circuit of the foregoing type for a television receiver wherein control signals are developed in response to such undesired noise components in the composite video signal information and wherein the noise components may be replaced by such derived control signals having a selectably fixed amplitude.

Still another object of the present invention is to provide an improved noise processing circuit of the foregoing type for a television receiver wherein control signals are generated and utilized to replace the undesired noise components in the composite video signal information and wherein the amplitude of the control signals is selectively controlled to substantially correspond to the level of video information immediately prior to the occurrence of the detected noise component.

Yet another object of the present invention is to provide an improved noise processing circuit of the foregoing type for a television receiver that lends itself to circuit construction and integration and may easily be reduced to a monolithic structure.

In one aspect of the invention, a noise processing circuit is provided for a television receiver wherein the composite video signal information is derived and then monitored in a comparator wherein pulses are generated on the occurrence of noise components above a certain predetermined level. These pulses are amplified and then limited to a selected, but uniformly fixed amplitude level. A high pass filter passes all but the very low frequency components. The derived control signals are then fed to one input of a signal processing stage with the unmodified composite video signal being fed to another input thereof. The signal processor is maintained at an operating level such that the video information passes unchanged therethrough until a high level noise component is sensed. At a predetermined level, the signal processor switches off the noise component and passes the generated control signal corresponding to such noise component. The amplitude of the control signal is maintained at a selected gray level as the best compromise in minimizing the visual effect on the face of the television screen.

In another embodiment of the invention, noise components and the composite video signal information are used to generate control pulses which in turn control the operation of a transistorized switching circuit through which the composite video information must pass. Upon the occurrence of a high level noise component, the transistorized switch is turned off. However, a memory storage device is included in the switching circuit, in this case, a capacitor, the charge on which follows the level of video information in the composite signal. Thus, even though the transistor switch may be turned off, the signal level is nevertheless maintained by the charge on the capacitor or other memory device until such time as the noise component disappears and the transistor switch is again actuated to pass composite video information. Thus, during noise disturbance exceeding the predetermined level, the video signal is held to the last level prior to the noise impulse.

DESCRIPTION OF THE DRAWINGS ILLUSTRATING THE INVENTION

The features of the invention which are believed to be novel are set forth with particularity in the appended claims. The invention itself, however, together with further objects and advantages thereof, may be best understood by reference to the following description in conjunction with the drawings, in which:

Figure 1:
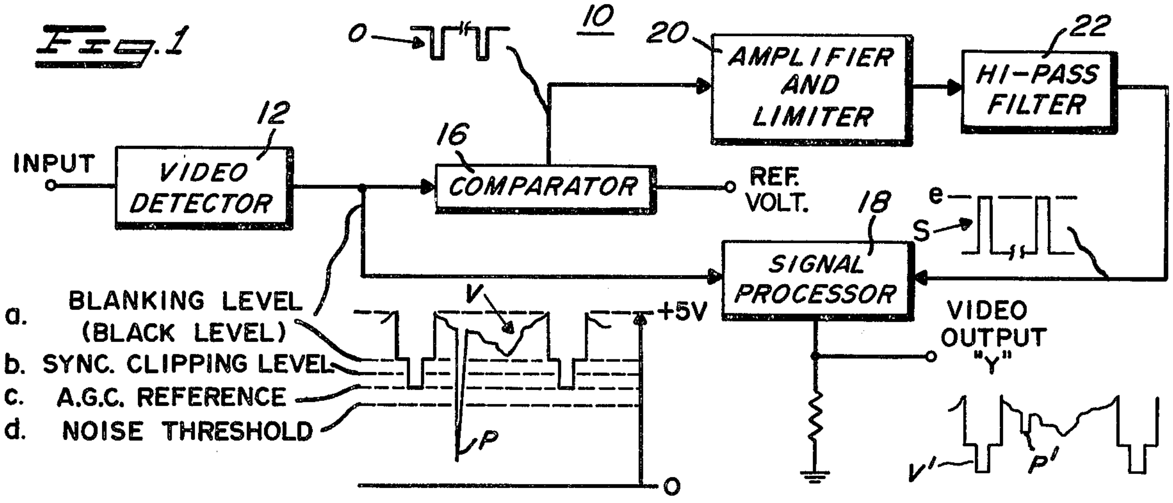
FIG. 1 is a block diagram of a noise processing circuit constructed in accordance with the present invention.

Referring now to the drawings, a noise processing circuit is shown generally at numeral 10, which circuit has been constructed in accordance with the present invention and is especially adapted for use in conventional television receivers. As shown in FIG. 1, circuit 10 includes means, such as a video detector 12, for deriving a source of composite video signal information V.

The composite video signal includes the customary video and sync information necessary for effective operation of the associated television receiver. As indicated, the composite signal is a positive voltage having blanking and synchronizing information at recurrent intervals separating video information. White level in the video portion of the composite signal is set at the maximum excursion, say at around five volts, with black level being substantially at the blanking, or reference level *a*. As further indicated, the composite video signal V is subjected to the occurrence of undesired noise components. One such component, indicated generally at P, is shown occurring in the video portion of the composite signal. Such noise components are customarily of relatively short duration, but of amplitudes which may extend beyond the sync tip level of the composite signal.

In the noise processing circuit 10, the composite video signal, including any undesired noise component, is applied to one input of a comparator circuit 16 and also to one input of a signal processing stage 18. A reference voltage is applied to the other input of the comparator 16 so that an output pulse O is provided for every noise component P at the input which exceeds a predetermined reference level, such as that as identified at *d* in the waveform shown in FIG. 1. Reference level *d* obviously must be at some value beyond sync tip level which is customarily utilized for AGC reference.

The output pulses O generated on the high level peaks of the noise components P are then applied to a suitable amplifying and limiting stage 20 and from there to a high pass filter arrangement 22. The output of filter 22 is a series of control pulses or signals S, all of a selectable but fixed amplitude, such as shown at *e*. The derived control signals are thus applied to the other input of signal processor 18. The result is that the composite video signal applied to the first input of signal processor 18, including the sync components and video information, is successfully passed therethrough without modification and appears at the output terminal identified at Y. The noise components, on the other hand, are not so passed, but are blocked out and substituted for by the derived control signals S.

As will be appreciated, the noise components P in the composite video signal V, and the derived control signals S in response thereto, are in substantial time coincidence. Accordingly, when the noise component reaches a level sufficient to switch off the signal processor 18 to further passage of composite video information, the control signals S reach an amplitude sufficient to render the signal processor 18 operative to pass the same to the output terminal Y. The result is composite video signal information which effectively has the undesired high level noise components replaced by the derived control signals S. Further, as mentioned previously, by selectively controlling the amplitude of the control signals to a set level intermediate the two extremes of the video information limits, i.e., in the gray level range between full white and full black, the visual impact of the presence of such noise or its signal substitution thereof is greatly reduced over that which would otherwise obtain.

Figure 2:
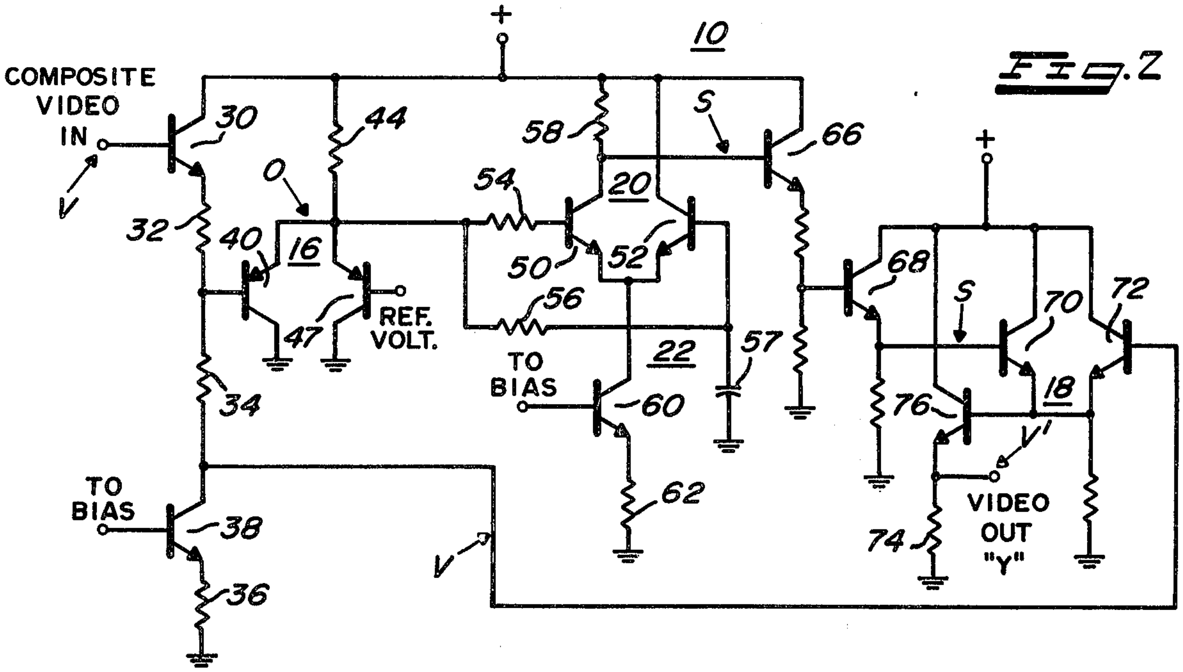
FIG. 2 is a partial schematic diagram of the noise processing circuit of FIG. 1 which has been constructed in monolithic form.

A partial schematic diagram of a noise processing circuit which has been found to provide satisfactory operation in accordance with the disclosed invention is illustrated in FIG. 2. The schematic is partial in the sense that it is in integrated circuit form and as such forms a part of a still larger overall monolithic integrated circuit chip adapted for video processing in a television receiver. That portion of the overall circuitry not directly related to the present invention has been omitted in the interests of brevity and clarity.

As shown in circuit 10 of FIG. 2, the source of the derived composite video information is applied to the input base of the transistor amplifier 30, the output of which is developed across a pair of serially connected resistances 32, 34 and also a resistance 36 in the collector-emitter circuit of a transistor 38 which has its base connected to a source of appropriate bias potential (not shown). The amplified composite video information is applied to the base of a p-n-p transistor 40 which in conjunction with a similar transistor 47, forms the comparator stage 16. The base input of transistor 47 is tied to a given reference voltage, as indicated, with the emitters of the two transistors 40 and 47 being connected together and tied to a source of operating potential through a common load resistance 44. The collectors of transistors 40 and 47 may be returned directly to ground.

The output of the comparator stage 16 is applied to the respective base inputs of transistors 50 and 52, connected in differential amplifier fashion, through resistances 54 and 56. Operating potential is applied directly to the collector of transistor 52, but to the collector of transistor 50 through a suitable load resistance 58. The emitters of transistors 50 and 52 are connected together and coupled to the collector-emitter circuit of still another transistor 60, acting as a constant current source. The base of transistor 60 is connected to an appropriate bias source (not shown) and its emitter is returned to ground through a resistance 62. The output of the differential amplifier forming stage 20 is taken at the collector of transistor 50. The high pass filter 22 is formed by the combination of resistance 56 and a capacitance 57 connected between the base of transistor 52 and ground.

The output control signals S at the collector of transistor 50 are applied through a pair of transistors 66 and 68, connected in tandem and serving as suitable level shifters, to the base input of a transistor 70. Transistor 70 in conjunction with an additional 72, serves as the noise processor stage 18. Accordingly, the collectors thereof are connected to a source of operating potential as shown, and their emitters are coupled together and returned to ground through a common load resistance 74. The output of the noise processor 18 is taken at the emitter of an additional associated transistor 76, having its input base connected to the coupled emitters of transistors 70 and 72.

In operation, the amplified, but unmodified, composite video signal information at the output of transistor amplifier 30 is applied to the base input of transistor 40 and also to the base of transistor 72. The reference voltage at the base of transistor 47 is such as to render the transistor at a conductive level sufficient to maintain a given voltage drop across resistance 44. The voltage at the junction of emitters of transistors 40 and 47 is such that transistor 40 will be rendered conductive at a positive voltage below that indicated at level *d* for the voltage waveform V in FIG. 1, but nonconductive at levels above that reference. Accordingly, transistor 40 is conductive only on noise components whose amplitude exceeds the set threshold level *d*. Upon conduction of transistor 40 on high level noise peaks, the voltage drop across resistance 44 increases and a negative-going output pulse O is generated for application to the base inputs of transistors 50 and 52.

For low frequency components of the applied waveform, the differential amplifier comprising transistors 50 and 52 operates in common mode, and with resistances 54 and 56 being of substantially the same component value there will be no appreciable output. For higher frequency components, however, the inputs of the differential amplifier 20 are operated in the fully differential mode by virtue of the high pass filtering action effected by filter 22 formed by the combination of resistance 56 and capacitor 57. The result, then, is a series of alternating-current signals in the form of positive-going pulses at the collector of transistor 50. These pulses are control signals of a uniform but fixed amplitude as determined by the operating characteristics of differential amplifier 20. As will be appreciated, there is an output control signal S for each noise component P that appears in the composite video signal having an amplitude exceeding the referenced level *d* indicated in FIG. 1.

These derived control signals S are applied through transistors 66 and 68 to the base input of transistor 70. At the base input of transistor 72, forming the other input of signal processor 18, the unmodified composite video signal is applied the output of transistor 38. Accordingly, for sync components and video information in the composite signal V above the set reference level, only transistor 72 will conduct to pass such signal information therethrough to the base of transistor 76 and will be substantially unchanged. However, as the noise component appears in the composite video signal, the value of the positive voltage drops sharply towards zero (see FIG. 1), while the value of the corresponding control signal S at the base input of transistor 70 increases sharply in amplitude to a predetermined control level. As a result, the noise component P which appears at the base input of transistor 72 is effectively replaced by the derived signal S and is passed therethrough, and in turn to the base of transistor 76. The output composite video signal at the emitter of transistor 76 is substantially as that shown at terminal Y in FIG. 1 where the noise component is effectively substituted for by the derived control signal component P having an amplitude value intermediate white and black levels (i.e., gray level) established for video information.

Figure 3:
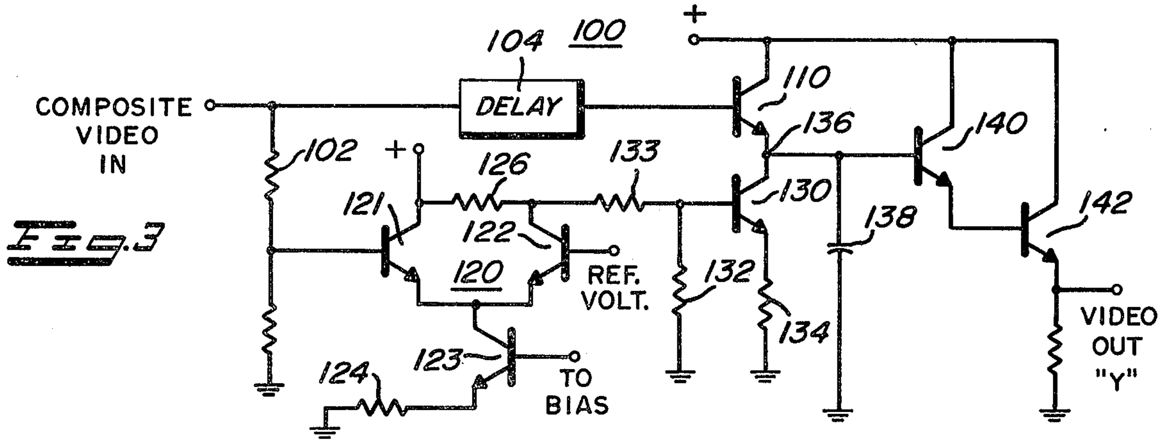
FIG. 3 is a partial schematic diagram of another embodiment of the noise processing circuit.

Still another embodiment of the invention is shown schematically in FIG. 3. The noise processing circuit 100 of FIG. 3 is characterized by the use of a unique sample and hold technique in the reinsertion of video in lieu of the undesired noise components. In this way, the proper brightness or luminous level is precisely maintained at all times for the reproduced image on the television screen.

In the noise processing circuit 100 of FIG. 3, the source of composite video information is applied to the base of transistor amplifier 110 through a suitable delay circuit 104, and also through a resistance 102 to the base input of an additional transistor 121, forming one part of a differential amplifier circuit arrangement 120. The other portion of differential amplifier 120 is effected by a transistor 122 having its base input biased at a fixed reference potential. An additional transistor 123 serves as a constant current source having its collector-emitter circuit interposed between the coupled emitters of transistor 121–122 and ground through a resistance 124, and its base connected to a suitable biased source (not shown). Operating potential is applied directly to the collector of transistor 121 and to the collector of transistor 122 through a suitable load resistance 126. The output of differential amplifier 120 is taken at the collector of transistor 122, and is applied to the base input of a transistor amplifier 130 through a current limiting resistance 132. Transistor 130 includes a further resistance 133 connected from base to ground and an additional resistance 134 from emitter to ground.

The emitter-collector junction point between transistors 110 and 130 serves as a common putput terminal 136, which in turn is coupled to the input of the pair of transistor emitter followers 140 and 142 connected in tandem. A storage or memory capacitor 138 is connected between the output junction point 136 and ground. Operationally, the reference potential at the base of transistor 122 is set at the noise threshold reference level (see FIG. 1). Accordingly, transistor 121 is conductive on video information above this set level and transistor 122 remains non-conductive. However, when a strong noise component appears driving the voltage at the base input of transistor 121 towards zero, it turns off and transistor 122 is driven into conduction. This produces a negative going output pulse at the collector thereof which is then coupled to the base of transistor 130 to effectively render it non-conductive. Transistor 110 and 130 were previously conducting to pass composite video information therethrough to transistors 140–142 in tandem and in turn to the output terminal Y.

It is to be noted that the charge on storage capacitor 138 substantially follows the level of instantaneous composite video level at any particular time. Normally, capacitor 138 discharges through transistor 130 and resistance 134 to ground. However, this obviously requires that transistor 130 be in the conductive stage. With transistor 130, and in turn transistor 110, rendered non-conductive, however, capacitor 138 will retain its charge, which is essentially at the level of video just immediately prior to the occurrence of the noise component. Upon the cessation of the noise component, transistors 130 and 110 are unblocked and the composite video information continues to be translated through transistors 110, 140 and 142 to the output terminal Y. However, the unwanted noise components have been effectively removed or blocked out of the composite video signal. Moreover, since the video remained fixed at the same level as that immediately prior to the occurrence of a noise component, thus serving a memory storage or hold function, the visual effect discernable in the image being reproduced is reduced to an effective minimum.

It will be appreciated that while only particular embodiments of the present invention have been shown and described herein, it will be obvious that certain modifications may be made without departing from the invention in its broader aspects and, accordingly, the appended claims are intended to cover all such changes and alternative constructions that fall within the true scope and spirit of the present invention.

What is claimed is:

1. A noise processing circuit arrangement for a television receiver, including in combination:

means for receiving a composite video signal having a portion for conveying sync components and a further portion for conveying video information varying between set white and black levels, said composite video signal being subject to the introduction of undesired noise components;

means for translating said composite video signal information to a terminal and further including means coupled with said terminal for supplying a charge level corresponding to the instantaneous level of the translated composite video signal to a memory storage means;

normally operative discharge means coupled with said terminal for providing a discharge path for such memory storage means; and circuit means for monitoring said derived composite video signal and deactivating said discharge means and said translating means in response to a noise component above a predetermined magnitude, the memory storage means during the deactivation of said translating means maintaining video level at said terminal at substantially the same level as that immediately prior to the occurrence of the said noise component.

2. A noise processing circuit arrangement according to claim 1 wherein said means for translating said composite video signal to said terminal includes a first transistor having base, collector, and emitter electrodes, with said composite video signal applied to the base electrode, the emitter electrode coupled with said terminal and the collector electrode coupled with a source of charging potential;

said discharge means comprises a second transistor of the same conductivity type as said first transistor and having base, collector, and emitter electrodes, the base of which is coupled with said monitoring circuit means, the collector electrode of which is coupled with said terminal and the emitter electrode of which is coupled with a point of reference potential; and said monitoring circuit means drives said second transistor to non-conduction in response to said noise components, so as to selectively interrupt said discharge path for memory storage means coupled with said terminal and further wherein non-conduction of said second transistor results in the charge stored by the memory storage means reverse biasing said first transistor during said noise components to render said first transistor non-conductive.

3. A noise processing circuit arrangement in accordance with claim 1 wherein said first-named means, said translating means, and said circuit means are all disposed in a single integrated circuit.

4. A noise processing circuit arrangement in accordance with claim 2 wherein said circuit means includes a differential amplifier having a first input for receiving said composite video signal, a second input to which a reference voltage is applied, and an output coupled to the base of said second transistor.

5. A noise processing circuit arrangement in accordance with claim 2 further including an emitter-coupled output transistor amplifier having a base electrode connected to said terminal for translating signals present on said terminal to an output terminal coupled with the collector-emitter path of said output transistor amplifier.

6. A noise processing circuit arrangement in accordance with claim 4 further including delay circuit means coupled between the base of said first transistor and said means for translating said composite video signal information.

* * * * *